United States Patent [19]
Scarpa

[11] 3,964,308
[45] June 22, 1976

[54] ULTRASONIC FLOWMETER

[75] Inventor: Thomas J. Scarpa, Edison, N.J.

[73] Assignee: Scarpa Laboratories, Inc., Metuchen, N.J.

[22] Filed: Apr. 1, 1975

[21] Appl. No.: 564,037

Related U.S. Application Data

[62] Division of Ser. No. 394,407, Sept. 4, 1973, Pat. No. 3,891,869.

[52] U.S. Cl. .............................................. 73/194 A
[51] Int. Cl.² ............................................. G01F 1/66
[58] Field of Search .................. 73/194 A, 71.5 US; 116/137 A

[56] References Cited
UNITED STATES PATENTS

| | | | |
|---|---|---|---|
| 2,669,121 | 2/1954 | Garman et al. | 73/194 A |
| 2,779,880 | 1/1957 | Malherbe | 73/71.5 US X |
| 3,204,456 | 9/1965 | Welkowitz | 73/194 A |
| 3,239,801 | 3/1966 | McGaughey | 73/71.5 US X |

*Primary Examiner*—Charles A. Ruehl
*Attorney, Agent, or Firm*—Martha G. Pugh

[57] ABSTRACT

Ultrasonic system for measuring fluid flow by comparing the responses from pulsed beams transmitted obliquely in opposite directions through fluid flowing in a pipe section. The transducer assembly includes a driving element comprising a piezoelectric generator in the form of a disk with a high mass backing element bonded to one face and an acoustic wave transformer bonded to the other face. The wave transformer element varies in cross-section in an axial direction, comprising disks of maximum dimension at the generator face and at the radiating face, which are separated by a connecting portion of minimum dimension. In preferred form, the wave transformer is shaped like a barbell. An advantage of this configuration is that the beam pattern is a function of frequency, having a dominant central lobe at about 45 kilocycles per second which becomes relatively depressed with respect to increasing side lobes as the frequency is increased. Although the invention has been described in general terms, the primary uses of the system and components as disclosed herein are for the measurement of the flow of gases.

6 Claims, 15 Drawing Figures

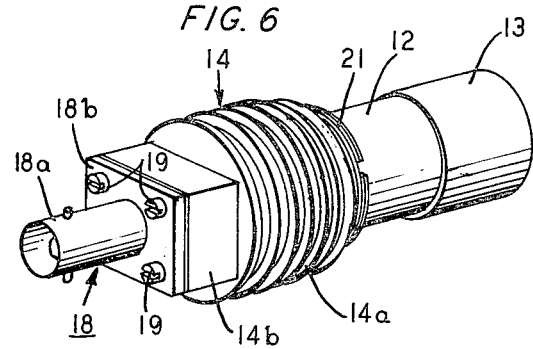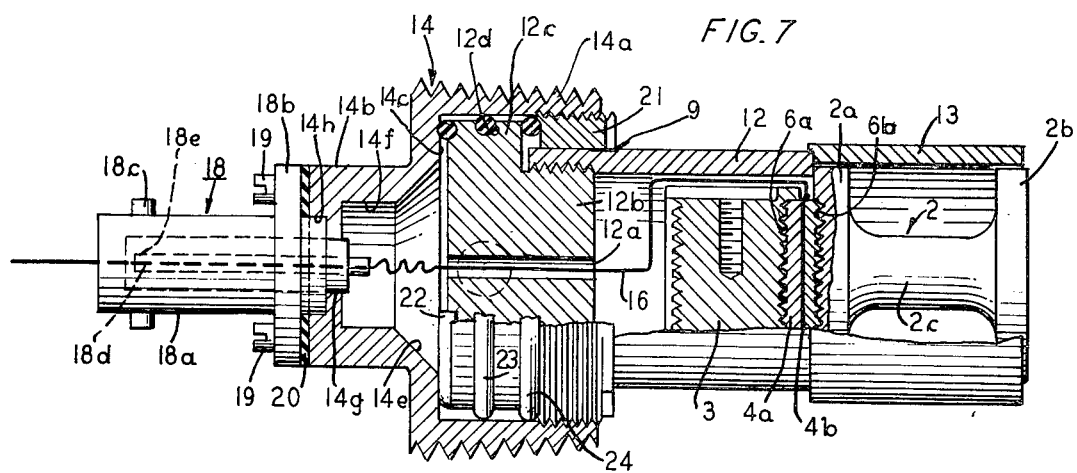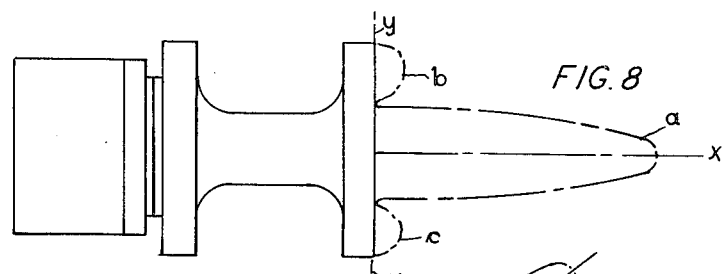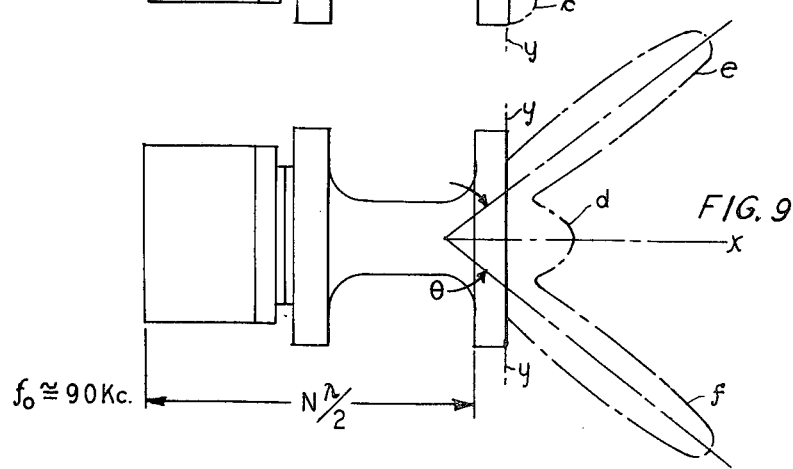

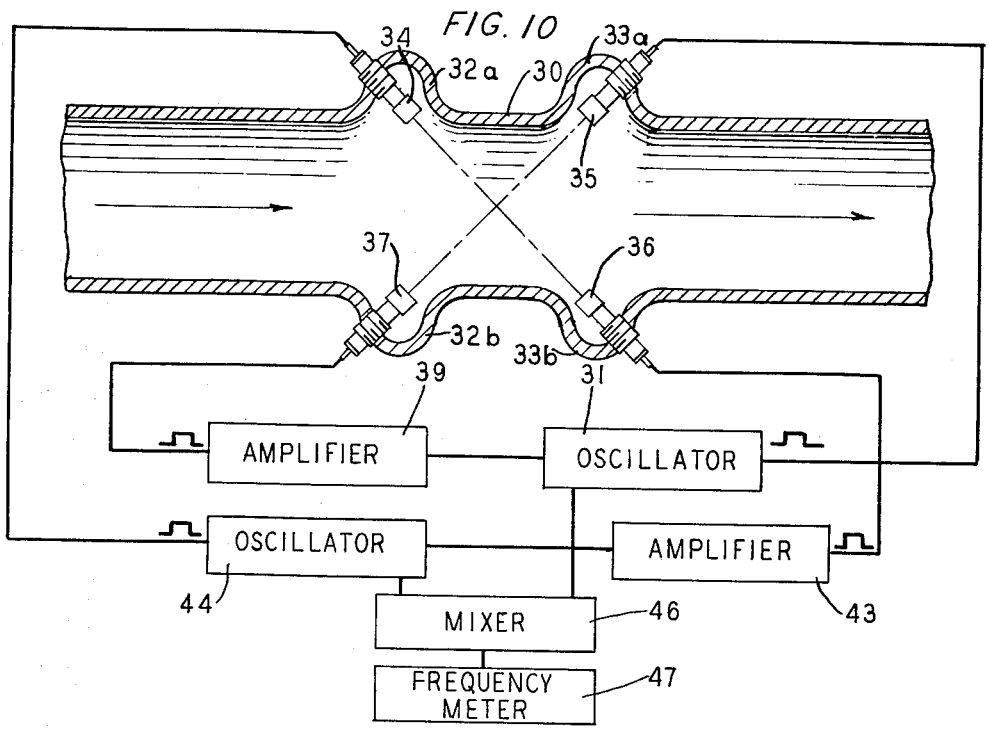
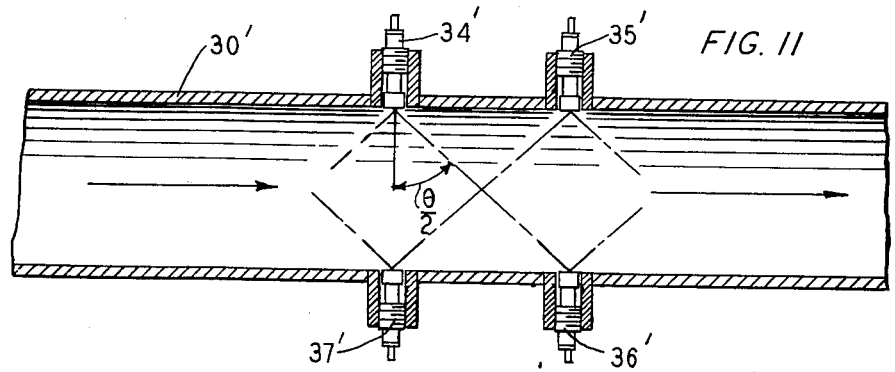
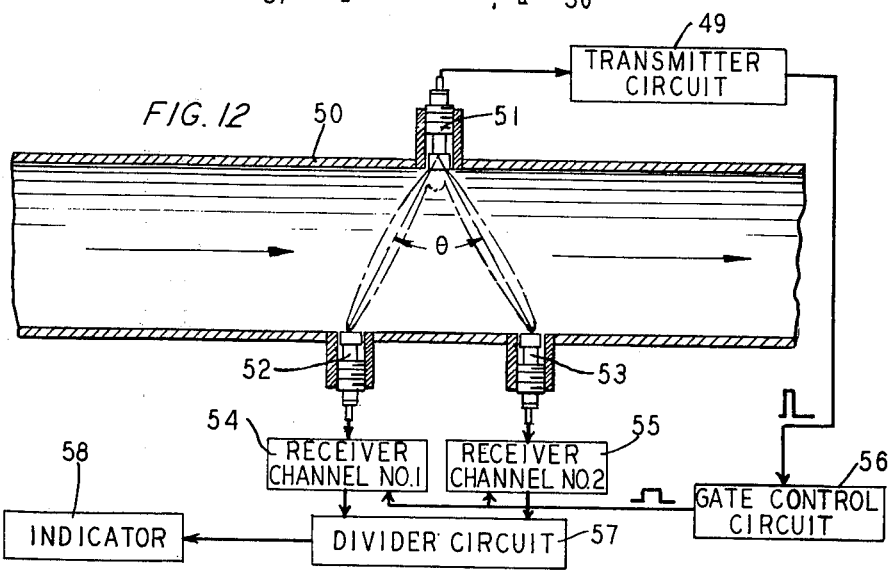

3,964,308

ULTRASONIC FLOWMETER

This is a division of my copending application Ser. No. 394,407 filed Sept. 4, 1973, now U.S. Pat. No. 3,891,869, issued June 24, 1975.

BACKGROUND OF THE INVENTION

This relates in general to ultrasonic flowmeter systems and, more specifically, to the transducer assemblies employed in such systems, particularly for measurement of the flow of gas.

In ultrasonic flowmeter systems of a type disclosed in the prior art, the velocity of fluid flowing in a test pipe section is measured by transmitting a pulsed ultrasonic beam obliquely across the pipe section from a transmitting transducer interposed at one point in the pipe to a receiving transducer interposed at a second position in the pipe, spaced up or downstream from the first. When an ultrasonic wave is transmitted through the test fluid, the time required for such transmission is dependent on the velocity of the ultrasound in the fluid, the length of the path over which the beam is transmitted and the velocity at which the fluid is flowing. The velocity of fluid flow either adds to or substracts from the transmission time, depending on whether the beam is transmitted against or in the direction of the stream of flow. Thus, a feedback circuit produces a signal having a frequency or repetition which varies in accordance with the time required for the ultrasound waves to travel over a predetermined path in the fluid.

Such ultrasonic systems are well-known in the art, as disclosed, for example, in U.S. Pat. No. 2,669,121 to R. L. Garman et al, issued Feb. 16, 1954, and by others.

In accordance with prior art practice, the transducer used for transmitting and/or receiving the ultrasonic beam in such a system were so constructed that the maximum lobe of the emitted beam was directed in substantially a normal direction from the face of the transducer. Thus, in order to provide a beam capable of crossing the stream of fluid flowing in the pipe at an oblique angle, it was necessary to build a shoulder or supporting nipple onto the surface of the pipe. This obviously requires precise modifications in the pipes to which such a system is applied. Moreover, it creates a series of recesses in the inner pipe wall, associated with the obliquely positioned transducers which tend to cause interruptions or turbulence in the fluid flow being measured.

In addition, particularly in measurement of the flow rates of gases or low density liquids, problems arise in impedance matching the radiating member of the transducer assembly to the fluid in such a way as to avoid unwanted reflections and thereby energy loss.

SUMMARY OF THE INVENTION

Accordingly, it is a principal object of the present invention to provide an ultrasonic system for measuring fluid flow in pipe systems which is substantially more sensitive, more efficient and more economically constructed than the systems of the prior art.

A particular object of the present invention is to provide an ultrasonic system for measuring fluid flow in pipes transporting gases and low density fluids in which the ultrasonic transducing assemblies are impedance matched to the measured fluid.

Another object of the invention is to provide a system in which alterations in the test pipe surface for installing transducers are minimized.

A further object of the invention is to provide a system in which turbulence and other distortions in the flow of the test fluid are minimized.

Another object of the invention is to provide an ultrasonic system including transducer assemblies which are constructed to radiate narrow, high velocity beams.

Another object of the present invention is to provide an ultrasonic system including a transducer assembly in which the principal beam direction with reference to the radiating face may be controlled as a function of frequency.

These and other objects, features and advantages will be apparent to those skilled in the art as set forth in the invention hereinafter.

The present invention relates to ultrasonic systems for measuring fluid flow in a pipe in which one or more pulsed beams is transmitted obliquely through the fluid from a transmitting transducer interposed through the pipe wall in one position to a receiving transducer interposed through the pipe wall in another position, the effect of the fluid flow velocity on the pulse transmission time being computed electronically.

In order to facilitate the operation of such a system, the present invention contemplates a novel type of transducer assembly claimed in my copending application Ser. No. 394,407, now U.S. Pat. No. 3,891,869, which includes a driving element comprising a longitudinal thickness-mode piezoelectric generator in the form of a disk having a backing element of relatively high mass bonded to one face and an acoustic wave transformer bonded to the other face. The whole assembly is preferably an integral number of quarter-wavelengths along the principal axis in the vibrating frequency of the system. The transformer diminishes in cross-section from a maximum at the bond with the driving element to a relatively small cross-sectional dimension along its axis at a parallel plane remote from the bond. The small cross-sectional dimension is broadened out at the radiating end to form a center driven radiating disk of relatively small mass. The diameter of the radiating disk is preferably a half-wavelength in the operating frequency; and, it is disposed parallel to the face of the piezoelectric generator and normal to the axis of the transformer. The mass ratio between the backing element, which may comprise a metal cylinder, and the transforming element lie anywhere within the range 2:1 to 30:1, thereby producing a particle velocity transformation of from 2:1 to 100:1 between the face of the piezoelectric generator and the radiating disk. The transformer, including the disk, functions to step down the impedance by increasing the area of contact at the radiating surface, which moves in small arc vibrations at high velocity. Thus, the low impedance at the face of the radiating disk is substantially equal to that of air, or any other low density fluid. This has the advantage of greatly increasing the efficiency of the transducer assembly by reducing the energy losses from distortions and reflections at the interface. A tight beam of small angular divergence is radiated by transducer assemblies designed in accordance with the present invention. This permits the ultrasonic beams so radiated to be transmitted and received over greater distances than with the same expenditure of energy using prior art structures.

In accordance with a preferred form of the invention claimed in my copending application Ser. No. 394,407, now U.S. Pat. No. 3,891,869; the solid energy transforming member may assume a shape somewhat like a barbell with disks of equal diameter on the two ends connected by a cylindrical axial portion having a diameter about one-third that of the end disks. In the disclosed embodiment, the left-hand disk which is bonded to the face of the piezoelectric generator is substantially thicker than the radiating disk.

In accordance with a variation thereof, the cross-sectional dimension of the transforming member decreases exponentially until it reaches a minimum cross section of, say, one-tenth the diameter bonded to the piezoelectric element. The minimum cross-sectional plane is then bonded or otherwise integrally connected in driving relation to the center of a thin disk about the same diameter as the piezoelectric generating element. There are numerous other suitable shapes for the transforming element of my copending application Ser. No. 394,407, now U.S. Pat. No. 3,891,869; the only requirement being that the cross-sectional dimension decrease in a manner symmetrical about the longitudinal axis from a maximum at the area of contact with the piezoelectric generator surface to a minimum along the axis at a plane removed from the generator surface; and, that the minimum cross-sectional area function as the central driving means for an expanded radiating surface comprising a relatively thin disk normal to the axis. Such a transformer configuration bonded to one face of a piezoelectric generator, to the other face of which is bonded a backing element of relatively higher mass, constitutes a transducer assembly with numerous advantages. It produces a highly efficient narrow ultrasonic beam impedance matched to gas and low density liquids.

As a further feature of the invention claimed in my copending application Ser. No. 394,407, now U.S. Pat. No. 3,891,869, the transducer assembly described in the foregoing paragraphs is supported in a coaxial acoustically isolating for providing electrical connections between the energizing circuit and the piezoelectrically active transducer, which may comprise a sandwich transducer of the bimorph type.

A particular advantage of the structure of the present invention is that the beam pattern has been found to be a function of frequency. Whereas at a frequency of about 45 kilocycles per second, the beam has a dominant central lobe and relatively suppressed side lobes, I have found that by increasing the operating frequency to about 90 kilocycles per second, the central lobe is depressed and the side lobes become dominant.

When transducers of the type disclosed herein are incorporated in an ultrasonic flowmeter of the general circuit arrangement disclosed by Garman et al, supra, substantial advantages ensue in that such a flowmeter is especially adapted to measure the flow rates of gas and other low density fluids with high efficiency. Moreover, assuming the transducer assemblies are operated in a frequency range producing dominant side lobes, it becomes unnecessary to build shoulders or nipples into the pipe wall for respectively supporting the individual transducer assemblies in an oblique direction with reference to the axis of the pipe. Instead, the transmitting and/or receiving transducer assemblies may be interposed into the test pipe section in directions respectively normal to the pipe surface. In this type of operation the pulsed side lobe beams are transmitted and/or received obliquely in the pipe from two or more identically operated transducers positioned in obliquely spaced-apart positions so that while one transducer assembly transmits an obliquely directed beam, another transmitter assembly is positioned to receive the obliquely transmitted beam, and vice versa.

Other objects, features and advantages will be understood from a detailed study of the specification hereinafter with reference to the drawings of which the following is a short description.

BRIEF DESCRIPTION OF THE DRAWINGS

FIG. 6 is a showing in perspective of the transducer assembly in one form of housing for incorporation into a test pipe system;

FIG. 7 is a longitudinal section of the assemblage of FIG. 6;

FIG. 8 is a schematic cross-sectional showing of the transducer assembly disclosed in FIGS. 1 and 2, indicating the general outline of the ultrasonic beam radiated at an operating frequency of about 45 kilocycles per second, comprising an enlarged central lobe and minimal side lobes;

FIG. 9 is a schematic cross-sectional showing of the transducer assembly disclosed in FIGS. 1 and 2, indicating the general outline of the ultrasonic beam radiated at an operating frequency of about 90 kilocycles per second, comprising enlarged side lobes, the central lobe being substantially suppressed;

FIG. 10 is a schematic circuit showing of an ultrasonic flowmeter of the pulsed beam type employing a rectangular array of four transducer assemblies of a type shown in FIG. 8, driven at about 45 kilocycles per second, and each characterized by a beam having a prominent central lobe;

FIG. 11 is a schematic circuit showing of an ultrasonic flowmeter of the pulsed beam type employing a rectangular array of four transducer assemblies of a type shown in FIG. 9, driven at about 90 kilocycles per second, and each characterized by a beam having a pair of enlarged side lobes and a suppressed central lobe; and FIG. 12 is a schematic circuit showing of an ultrasonic flowmeter of an alternative form to that indicated in FIG. 11 employing a triangular array of three transducer assemblies of a type shown in FIG. 9, driven at about 90 kilocycles per second, and each characterized by a beam having a pair of enlarged side lobes and a suppressed central lobe.

DETAILED DESCRIPTION

Figure 1:
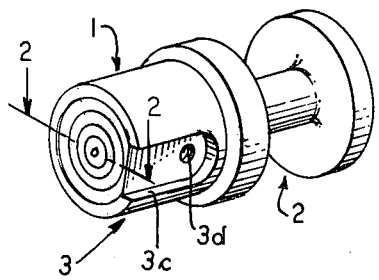
FIG. 1 is an overall perspective showing of the narrow beam transducer assembly of the present invention.
Figure 2A:
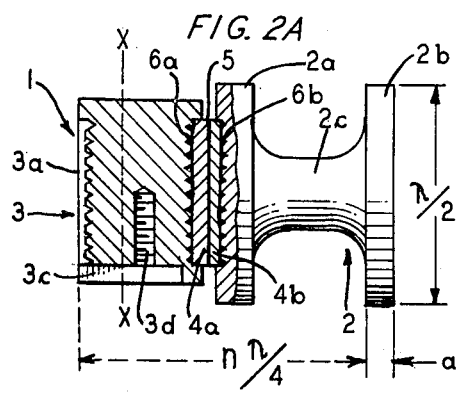
FIG. 2A is a longitudinal section through the plane indicated by the arrows 2—2 of FIG. 1.

Reference will now be made to FIGS. 1 and 2A of the drawings which show a preferred form of the transducer assembly of the invention claimed in my copending application Ser. No. 394,407, now U.S. Pat. No. 3,891,869.

The radiating face 2b of the transducer assembly may be considered to be a center driven thin plate, vibrating in a flexural mode. The driving force is a longitudinal or compressional wave that is converted by the geometry into a flexural, radial wave in the disk. In such a transition, the phenomenon of velocity dispersion occurs which makes the resonant frequency of the disk difficult to mathematically predict, and is usually arrived at by empirical experimentation.

The velocity constant $c_f$ for the flexural wave in the disk 2b may coarsely be computed from an equation that is derived from a fourth order differential equation given by P. M. Morse, *Vibration and Sound*, 2nd edition, McGraw Hill, New York, 1948, pp. 154 and 209. For a plate whose width $>> a$:

$$c_f = \left[ \frac{Y_o K^2}{\rho(1 - \delta^2)} \right]^{1/4} (2\pi f)^{1/2}$$

Where: $c_f$ = Flexural velocity $Y_o$ = Youngs Modulus $a$ = Plate thickness, of 2b as indicated in FIG. 2 $K$ = Radius of gyration (for a plate = $a/\sqrt{12}$ $\rho$ = Density of the plate $\delta$ = Poisson's Ratio $f$ = Frequency of vibrations.

The combination 1, disclosed in FIG. 1, in perspective, has two visible elements, namely, the acoustic wave radiator 2 and the backing element 3. As shown in the sectional view of FIG. 2A, a composite piezoelectric driving unit of the bimorph type comprising elements 4a,4b is mounted contiguously with the circular inner faces of the backing element 3 and the acoustic wave radiator 2, or transforming element.

The active elements 4a,4b may be of any piezoelectric crystalline body known in the art, formed or polarized to vibrate principally in a resonant-thickness mode of vibration. For the purposes of the invention claimed in my copending application Ser. No. 394,407, now U.S. Pat. No. 3,891,869, elements 4a,4b are preferably disk-shaped wafers of lead-zirconate-titanate dimensioned in accordance with the desired frequency. In the present illustrative embodiment, they are 0.500 inch in diameter and, say, 0.078 inch thick; and are constructed to vibrate in a longitudinal-thickness mode at a resonant frequency of about one megahertz. It will be understood that the wafers 4a,4b are thicker or thinner, depending on the desired resonant frequency of the principal mode. Disks of leadzirconate-titanate, of a type and dimension suitable for the uses of the present invention, may be obtained commercially in various diameters and in thicknesses of 0.5 inch or less.

As a step in their preparation, the piezoelectric wafers 4a,4b are polarized in accordance with well-known prior art practice by the application of a polarizing voltage in a thickness direction substantially normal to the major faces of the wafer, while the temperature is lowered through he Curie temperature. Moreover the elements 4a,4b are aged to give them stable electroacoustic characteristics, poling and aging having been carried out by the suppliers in a manner taught, for example, in a bulletin entitled "Aging of Ferroelectrics", New Jersey Ceramic Research Station, Rutgers university, New Brunswick, Technical Report No. 1, Rt. 1, TR-59-128 (July 1, 1959) (AD-227-737-1004).

An important step in the process of preparing these piezoelectric elements is the careful cleansing and preparation of the contacting surfaces prior to assemblage into any of the combinations disclosed hereinafter. For example, the wafers 4a,4b when obtained commercially, or after prepolarizing treatment, may have permanent electrode coatings on their major parallel surfaces. For some embodiments of the present invention these are carefully removed by lapping to a depth of .005 inch with any of the lapping compounds known in the art, such as, for example, aluminum oxide and water.

After the foregoing treatment the surfaces of the ceramic wafers 4a,4b are further cleaned by exposing the elements to ultrasonic cleaning action in a container of, for example, an isoprophyl alcohol or acetone, or any similar solvent which is characterized by rapid evaporation, and which is not readily absorbed by the ceramic. The ultrasonic vibrations are generated in the cleansing liquid by means of, for example, a 100 to 200 watt generator operating at a frequency of, say, 40 kilocycles per second, for about 10 minutes.

In addition to the use of lead-zirconate-titanate, which is the piezoelectric disclosed in the present illustrative example, any other ceramic or piezoelectric crystalline materials may be employed for the purposes of the present invention which are capable of producing an element which vibrates in the longitudinal-thickness mode, such as, for example, barium titanate, X-cut quartz, etc.

As pointed out hereinbefore, the crystal elements 4a,4b are sandwiched together with an electrode coating, preferably an acoustic conducting epoxy characterized by an electrical resistivity of at least about 0.01 ohm-centimeter at 25° C., providing a coating which forms the inner electrode 5. A suitable conductive cement for this purpose can be obtained from the Hysol Company as No. 4238, which is cured with Hysol hardener No. 3469, or a similar combination. The external electrodes 6a,6b comprise similar coatings applied to the external surfaces of elements 4a,4b. As previously stated, the piezoelectric sandwich 4a,4b is interposed between the cylindrical backing element 3 and the acoustical transforming element 2, which will now be described.

Although the piezoelectric element 4a,4b is disclosed herewith as a bimorph, it will be understood that a single crystal wafer can be used. Moreover, although elements 4a,4b are disclosed as being cylindrical in the present illustrative example, it will be understood that they can be other shapes, such as rectangular.

Figure 3A:
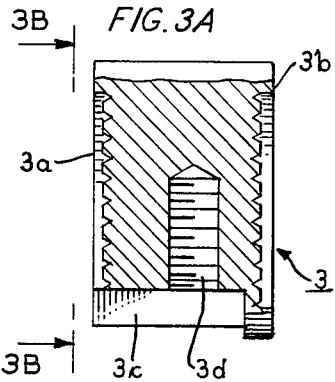
FIG. 3A is an enlarged sectional showing of the backing element 3 of FIGS. 1 and 2.
Figure 4:
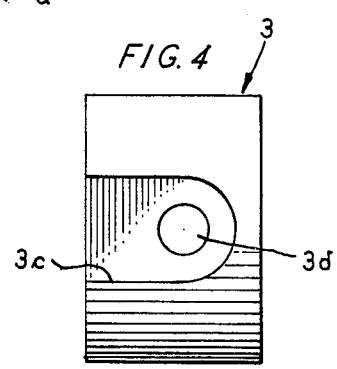
FIG. 4 is an enlarged side elevational showing of the backing element 3 of FIG. 1, showing the recessed area for the screw hole 3d.
Figure 3B:
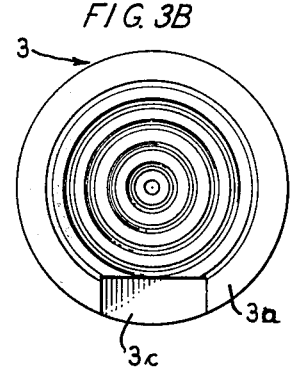
FIG. 3B is an end elevation showing the face 3b.

Referring to the FIGS. 3A, 3B and 4, it will be seen that in the present example the backing element 3 comprises a substantially cylindrical metal element of stainless steel having an outer diameter of 0.625 inch and an axial length of 0.410 inch. The right- and left-hand faces 3a and 3b each have circular recesses symmetrical about the axis which are 0.02 inch deep and have a diameter of 0.500 inch. The inside faces of each of these recesses are respectively grooved with a series of annular grooves 0.010 inch deep and spaced apart 0.050 inch. The recess of right-hand face 3b serves to accommodate the face of the piezoelectric element 4a, together with the cementing epoxy mixed with conducting coating which is forced into the indentations to provide a better bond. Adjacent the left-hand face is a lengthwise indentation 3c about 0.25. inch wide and 0.360 inch deep which is rounded at the inner end to accommodate a screw hold 3d which is 4/4. inch in diameter with a tap 4 inches deep. This serves for mounting the backing element 3 when the transducer has been assembled. It will be understood that in addition to stainless steel, as disclosed for the present illustrative example, backing element 3 may alternatively be formed of any other high density element, such as high carbon steel, monel metal, or even ceramic material having sufficient density to serve as a loading element. Although the backing element 3 is disclosed herein as being cylindrical, it will be understood it is not limited to that shape.

Figure 2B:
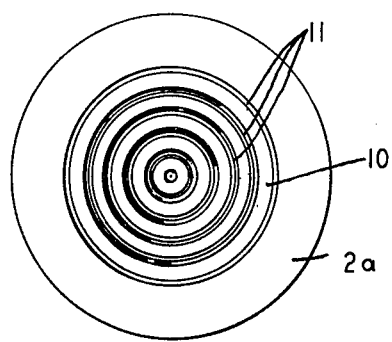
FIG. 2B is a modification of a section of the left of the plane $x-x$ in FIG. 2A, including a feedback crystal.

In addition to the piezoelectric elements 4a,4b, a modification of the invention shown in FIG. 2B includes an auxiliary piezoelectric element 7 for feedback purposes, which may be of any thickness between, for example, 0.15 inch and 0.78 inch. This is bonded into the recess of the left-hand surface of the backing element 3 in the same manner that the composite element 4a,4b is bonded to the right-hand recess. Similarly, electrode coatings 8 and 9 are included which may also comprise conducting epoxy of the type previously described.

The unique element of the combination disclosed is the energy transforming and acoustic wave radiating element 2. This combination is preferably formed of a metal such as aluminum, titanium, monel or stainless steel.

In accordance with the invention claimed in my copending application Ser. No. 394,407, now U.S. Pat. No. 3,891,869, the element 2 has substantially smaller mass than the element 3. However, the ratio of the mass of the backing element 3 to the acoustic wave transforming-radiating element 2 may lie anywhere within the range 1:1 up to 30:1 or 40:1 or higher.

Figures 5A, 5B:
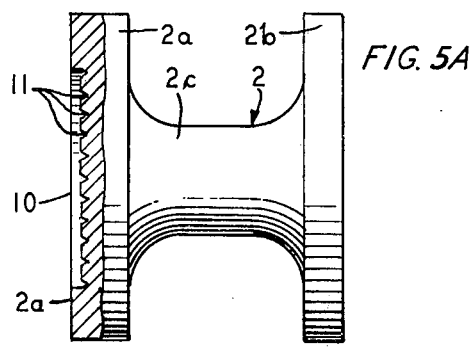
FIG. 5A is an enlarged side elevational showing of the acoustical transformer 2 of FIG. 1.
FIG. 5B is an end elevational showing of the left-hand end face 2a of the acoustic transformer 2 of FIG. 5A.

The function of the impedance member 2 is two-fold. One function is to provide a substantial increase of the particle velocity from its driving end 2a to its driven end 2b. Another function is to provide a driven end having an impedance substantially matched to air or gas impedance, which is center-driven and has a large radiating surface constructed to withstand high temperatures and pressures, and substantially resistant to corrosion. This is accomplished by providing an element shaped, for example, as shown in FIG. 5A, in which the left-hand, or driven, portion comprises a disk-like end 2a which has a diameter 0.750 inch and is cylindrical having a thickness in an axial direction of 0.135 inch. As explained with reference to the element 3, the left-hand face of the disk-like end 2a has a recess 10 matching the recess in the right-hand end of the cylindrical element 3 for mounting the face 4b of the piezoelectric sandwich element 4a,4b. As described with reference to the backing element 3, the recessed portion of the left-hand face 2a is provided with a series of annular grooves 11 which are 0.010 inch deep and spaced apart 0.050 inch for receiving the conducting epoxy coating on the contacting face of the piezoelectric sandwich element 4b. In the present embodiment, the transforming member 2 is 0.625±0.005 inch long, in an axial direction, tapering conically to a diameter at mid-section of about 0.250 inch. The right-hand end is expanded in cross section to a diameter of 0.750 inch, forming a plate-like radiating member 2b 0.090 inch thick, the radiating face being made parallel with ±0.002 inch to the face of the driven end 2a which is in contact with the electrode coating on the face of piezoelectric active element 4b. The diameter of the radiating element 2b preferably approximates a half-wavelength in the vibrating frequency of the transducer; although it will be apparent that this is only approximate, as the system is designed to operate over a range of frequencies. In order to have a pronounced main lobe the diameter of the disk should be limited to under one wavelength. However, the smaller the diameter, the less is the impedance match. If the diameter exceeds one wavelength, the vibration of the disk breaks up into multiple modes and produces a suppressed main lobe and pronounced side lobes, generally two main lobes with a multiplicity of minor lobes. The axial length of the combination, as shown in FIG. 2A, from the center of the radiating end 2b to the left-hand face of the backing element 3, preferably approximates an integral number of quarter-wavelengths in the vibrating frequency.

It will be understood tha although a specific embodiment of the transforming element 2 is disclosed herein by way of illustrative example, the transforming element can take other forms within the teaching of the present invention, in which the driving means applied at the center of the right-hand radiating element 2b serves to step-up the particle velocity anywhere within the range 2:1 to 100:1; and, the disk element 2b, which is disposed at the high velocity end of the transformer, serves to substantially step-down the impedance between the transforming element and the contacting medium by substantially increasing the area of contact.

It will be apparent that the manner in which the cross section of the transforming means 2 is reduced between the elements 2a,2b may assume the form of any one of a number of crosssectional curves well-known in the art, such as cone, parabola, catenary, etc., as long as the cross-sectional dimension is tapered from a large diameter at the driving end to a substantially small diameter at the plane at which the radiating member 2b is applied, so as to provide a velocity step-up.

Referring now to FIGS. 6 and 7 of the drawings, there is shown a preferred type of housing including a pipe fitting for a transducer assembly of the type described with reference to FIGS. 1 through 5B of the drawings.

FIG. 6 is an external perspective showing of the transducer assembly in the housing; whereas, FIG. 7 shows the complete assembly in longitudinal section.

The transducer assembly comprising the active piezoelectric sandwich element 4a,4b, backed by cylinder 3 and disposed in driving relation to a solid acoustic transformer 2, is enclosed in the stainless steel tubular housings 12 and 13. The latter are fitted together in longitudinal relation with the right-hand end of tube 12 bonded into a slight recess in the left-hand end of tube 13. The latter is 0.895 inch in outer diameter and 0.748 inch in inner diameter, being slightly recessed at the left-hand end, as indicated. Tube 13 is fitted coaxially around the solid transformer element 2 so that the right-hand face 2b of the latter protrudes about 0.015 inch from the end of the tube in an axial direction. Tubular housing 12 is 0.850 inch in outer diameter, 0.748 inch in inner diameter and 1.187 inches in axial length. Screwed onto the left-hand end of the tubular housing 12 is an end plug 12b having an annular flange 12c which is one fourth inch thick, 1.020 inches in outer diameter. At its right-hand end, plug 12b is reduced in diameter to form a screwthreaded nipple about 0.733 inch in outer diameter which protrudes one-fourth inch coaxially for internal engagement with a matching screw-threaded recess in the inner end of the tube 12. An axial bore 12a which is 0.078 inch in diameter, for accommodating lead wire 16, extends through the flange 12b and the nipple.

Flange 12c provides an annular shoulder extending outwardly about 0.075 inch in a radial direction from the screw-threaded surface of the nipple. The flange 12c includes an annular notch 12d which is 0.068 inch wide and 0.035 inch deep, symmetrically disposed between the opposite faces of the flange. The left-hand face of the plug 12b also includes an annular o-ring groove having a mean diameter 0.95 inch, which is 0.04 inch wide and 0.015 inch deep. An annular collar 21 which is 0.065 inch in inner diameter and 0.0884 inch in outer diameter, ¼ inch in axial length, and externally screw-threaded, is fitted near the left-hand end of tube 12, providing an annular clearance 0.05 inch wide with the shoulder of flange 12c. The aforesaid three annular notches are constructed to retain three O-rings 22, 23 and 24, which serve to acoustically isolate the inner transducer assembly and its housing from tubular brass enclosure 14, in a manner which will now be described.

The tubular enclosure 14 comprises an enlarged open right-hand end 14a, externally screw-threaded at 11½ turns per inch. It is 1⅜ in maximum outer diameter, 0.680 inch in overall length and slightly tapered from left to right in accordance with the National Plumbing Code taper for one-inch pipe. The open end of enclosure 14 forms a cavity 1.041 inches in diameter and 0.567 inch along the axis, terminating at its left-hand end in an annular inner shoulder 14c which is about one-fourth inches wide in a radial direction. The cavity is internally screw-threaded at its open right-hand end at a pitch of 32 turns per inch.

At its left-hand end, tubular enclosure 14 has a square tubular extension 14b, symmetrical about the axis, the outer dimension of which is 0.70 inch on a side, and which extends externally ⅜ inch to the left of the flanged screw-threaded portion 14a. The diameter of the cylindrical inner cavity of enclosure 14 drops off from the inner shoulder 14c for an axial length of about 0.113 inch, to form a smaller cylindrical inner cavity 14f which is ¼ inch in diameter and 0.4 inch along the axis. This is partly closed at the left-hand end, except for an axial opening 14g which is 0.209 inch in diameter to accommodate an "Amphenol" BNC-type connector, as will be described. In the present example, the axial depth of opening 14g is 0.055 inch; and, it leads into an annular recess 14h which is 0.351 inch in diameter and 0.045 inch deep at the center of the rectangular left-hand face of the extension 14b. The latter is constructed to mate with an "Amphenol"-type plug assembly 18, which will now be described.

The "Amphenol" coaxial-type connector is of substantially the general form indicated in J. V. Malek et al U.S. Pat. No. 3,054,981, issued Sept. 18, 1962, or C. W. Concelman U.S. Pat. No. 3,103,548, issued Sept. 10, 1963. It comprises a tubular outer conductor 18a of silver, or other conducting material, ⅜ inch in outer diameter, 1/32 inch thick, which extends ⅝ inch in axial length, terminating at the center of a rectangular plate 18b, 11/16 inch by 11/16 inch and 3/16 inch thick. This has screw holes to accommodate the screws 19 at its four corners, so that it mates adjacent the left-hand face of the rectangular extension 14b of the outer housing 14, in contact with gasket 20, about 1/32 inch thick, comprising rubber, "Neoprene" or another similar elastomer. A pair of diametrically opposite protuberances 18c provide means for locking shell 18a in electrical connection with an external coaxial lead. It will be apparent to those skilled in the art that the specific dimensions of pipe 14b and pipe plug 18b will vary so that each "Amphenol" type connector 18 is fitted to the pipe plug securely. Before the connector is put in place, a quantity of silicone rubber is interposed into the opening 14g to secure the connector. After the connector is in place, the silicone is allowed to cure 24 hours, after which a test is made to determine that there is no air leakage around the connector.

"Amphenol" connector 18 has a central conductor 18d, about 1/16 inch in diameter, embedded in an annular insulating member 18e, 3/16 inch in diameter. This combination is embedded internally in a solid conducting sheath 14g which makes solid integral contact with the inside of shell 18a, which extends from a position about ⅝ inch inside the left-hand end and continuing through to the right-hand face of the rectangular connecting plate 18b, where it protrudes about 1/16 inch beyond the surface of the plate, surrounding the insulating portion 18e, which protrudes an additional 1/16 inch, surrounding the axial conductor 18 which is connected to the high potential electrode coating 5 of piezoelectric elements 4a,4b to which it is soldered or otherwise electrically connected.

The flanged end 12c of tubular housing 12 fits into the cavity in the screw-threaded outer connector 14a so the left-hand face rests against the O-ring 22, one inch in outer diameter and 1/16 inch in thickness, resting against internal shoulder 14c. The O-ring 22 is preferably rubber or a rubber substitute, such as "Neoprene" or any other insulating material having a similar coefficient of elasticity. The second similar o-ring 23 is interposed in the annular notch 12d; and, the third similar o-ring 24 rests against the shoulder formed by the right-hand face of the flange 12c. As previously mentioned, the function of these three gaskets is to acoustically isolate the external housing from the transducer assembly. The combination, including o-rings 22, 23 and 24, is held in place by the annular collar 21, the rings being screw-fitted into the internal threads of the outer tubular housing 14a. The left-hand end of collar 21 contains two or three peripheral notches which are ⅛ inch wide and 0.09 inch deep. These are symmetrically spaced around the circumference of the collar.

Assuming the acoustically isolating O-rings 22, 23 and 24 to be nonconducting or insulating material, a conducting tab 9, about one-fourth inch wide and one-half inch long, is force-fit between the external surface of the cylindrical shell 12 and the internal surface of the screw-threaded collar 21, so as to make electrical contact between the two, providing a conducting path for the electrode coatings 6a,6b which are connected together to make electrical contact with the transformer face 2a, and hence, internal surface of the shell 12.

As an alternative to using the conducting tab 9, the elastomer o-rings 20, 22, 23 and 24 are formed of a mixture of elastomeric material with metallic powder, having a resistivity of at least 0.01 ohm-centimeter at 25° C. For example, a suitable conductive epoxy cement can be obtained from the Hysol Company as No. 4236, which is cured with Hysol hardener No. 3469 or a similar combination.

Referring to FIG. 8 of the drawings, let us assume that a transducer assembly of the type previously described is connected to a conventional high frequency oscillator operating at a frequency of the order of 45 kilocycles per second. The ultrasonic radiation pattern of the plate 2b, indicated in FIGS. 1 and 2A, includes a centrally directed ultrasonic beam having a major central lobe which is substantially symmetrical about the x axis. Laboratory measurements show that at a distance of one foot from the center of the plate 2a, along the x axis, the beam intensity varies in a relative manner as illustrated.

If a receiving meter is moved in a plane perpendicular to the face of the radiator through a series of points of identical ultrasonic intensity, a plotting of these points indicates a pronounced central lobe a, flanked by a pair of substantially symmetrically disposed side lobes b and c, of considerably weaker intensity. These patterns assume measurements made in air or another gas.

If, however, the frequency of the oscillator, operating at the same voltage and power, is increased to about 95 kilocycles per second, the radiation pattern changes to the general form indicated in FIG. 9. Measurements at the same level of ultrasonic intensity in a plane perpendicular to the face of the radiator produce a series of readings which, when plotted, indicate a radiation pattern of the form shown in FIG. 9 of the drawings. As indicated, the central lobe d is now suppressed, and a relatively larger amount of energy is contained in the side lobes. It is apparent that the operation of the transducer assembly at the 95 kilocycles per second frequency, in such a manner that it includes the prominent side lobes as shown, has many applications not hitherto shown in the art. Two of these will be described with reference to FIGS. 11 and 12 of the drawings.

First, however, a gas flowmeter circuit of FIG. 10 will be described wherein are employed four transducer assemblies of the type indicated in FIGS. 1 and 2a, which are operated at a pulse modulated frequency of the order of 45 kilocycles per second to produce in each case a beam pattern having a single prominent lobe of the type indicated in FIG. 8 of the drawings. The operation of the circuit shown in FIG. 10 is substantially similar to that described in U.S. Pat. No. 3,669,121 issued to R. L. Garman et al on Feb. 16, 1954, entitled Supersonic Flowmeter. The ultrasonic flowmeter shown schematically in FIG. 10 is designed so that the velocity of fluid in a pipe section is determined directly, the indication obtained being independent of the velocity of sound in the fluid. Different fluids transmit sound at different velocities, the velocity of travel through any particular fluid varying with temperature. By providing a device whose measured output is independent of such a variable, the necessity for recalibration and the allowance for temperature errors and other variables are avoided.

When an ultrasonic wave is transmitted through a fluid, the time required for such transmission is dependent on the velocity of sound in the fluid, the length of the path over which the ultrasonic wave is transmitted and the velocity of the fluid itself, the latter either adding to or subtracting from the transmission time depending on whether the ultrasonic wave is transmitted against or with the stream of flow.

In the flowmeter shown in FIG. 10, the time required for transmission of the ultrasonic waves over a predetermined path in the measured fluid is determined by the use of a feedback circuit which produces a pulsed signal whose repetition frequency is a function of the transmission time. This leaves two variables: namely, the velocity of the fluid to be determined and the velocity of sound through the fluid. In order to eliminate the velocity of the sound by cancelling it out from the final indicating instrumentality, two feedback circuits, driven from a common source of power, are utilized. One circuit includes amplifier 43 and pulse modulated, high frequency alternating current oscillator 44 which energizes transmitting transducer assembly 34 to transmit an ultrasonic beam to receiving transducer assembly 36, so that the beam obliquely intersects the fluid path. The other, which includes amplifier 39 and pulse modulated, high frequency alternating current oscillator 31, energizes transmitting transducer assembly 33 to transmit an ultrasonic beam to receiving transducer assembly 37, so that the beam obliquely intersects the fluid path in the opposite direction. Each of transducer assemblies 34, 35, 36 and 37 is so operated that it directs a principal ultrasonic beam substantially normally to the radiating surface. Hence, the axes of transducer assemblies 34 and 35 are respectively mounted in nipples 32a and 33a which are disposed obliquely in the wall of pipe section 30. Transducer assemblies 36 and 37 are similarly mounted in obliquely disposed pipe nipples 33b and 32b. In such an arrangement, each separate path will generate a signal of a different repetition frequency. The frequency of the signal in one path, namely from transducer assemblies 34 to 36, will be greater than the mean by an amount which is proportional to the velocity of the fluid; and, the frequency of the signal in the other path, from transducer assemblies 35 to 37, will be less than the mean by a like amount. Signals are derived from both paths and are impressed in opposing relation on the mixer circuit 46. The difference signal from mixer circuit 46, varying only as the velocity of the fluid, is used to provide an indication in meter 47, which is a function of the velocity of fluid flow in the pipe.

The foregoing will be more clearly understood by reference to the description in the aforementioned U.S. Pat. No. 2,669,121 to Garman et al, supra, which describes in detail the manner of operation of the circuit of FIG. 10, with the exception of the transducer assemblies 34, 35, 36 and 37, which are specifically of the form described in FIGS. 1, 2A, et seq. of this application, operated to radiate a beam having a dominant central lobe, in the manner of FIG. 8.

Assume for further example that transducer assemblies 34, 35, 36 and 37 are replaced with transducer assemblies 34', 35', 36' and 37' which are operated in the manner indicated in FIG. 9 of the drawings, at a frequency of the order of 95 kilocycles per second; and further, assume that the circuit to which they are connected is substantially of the configuration and operation shown and described hereinbefore with reference to FIG. 10.

Because of suppressed central lobe and the angular spread of approximately 30° between the side lobes e and f (FIG. 9), it is no longer necessary to modify the surface of the pipe section to provide special nipples 32a, 32b, 33a and 33b in which to mount the transducer assemblies as indicated in FIG. 10. Instead, pipe section 30', as shown in FIG. 11, is substantially unmodified, except for the drilling of an opening in a direction normal to the pipe wall for the positioning of each of transducer assemblies 34', 35', 36' and 37' in their respective housings. The latter are screwed, or otherwise closely fitted, to protrude in a normal direction through the wall of pipe section 30', so that the radiating face 2b of each of the transducer assemblies is substantially flush with the inner surface of the pipe. Referring to FIG. 9, it will be seen that each of the aforesaid transducer assemblies, when driven at a frequency of about 95 kilocycles per second, generates a pair of dominant ultrasonic side lobes for transmitting and/or receiving, which are directed obliquely, each at an angle $\theta/2$ relative to the direction of fluid flow in the pipe, where $\theta$ is the angle between the dominant side lobes. At the radiating face of each transducer assembly, one lobe is directed upstream, and the other downstream. Thus, with this modification, the system shown in FIG. 11 has its transducer assemblies 34', 35', 36' and 37' connected in substantially the same manner as the corresponding transducer assemblies of FIG. 10, in a pulse transmission and receiving system constructed and operated in a substantially similar manner thereto.

It will be appreciated that alternative arrangements of the flowmeter systems of FIGS. 10 and 11 can be made using, for example, two transducer assemblies positioned as indicated by 34' and 36', instead of four, with the circuit modified so that the direction of wave transmission is reversed at alternate intervals by alternately switching each transducer between the transmitting and receiving circuit.

Another alternative flowmeter system, making use of side beam transducer assemblies operated as indicated in FIG. 9, is shown in FIG. 12 of the drawings. This includes a conventional pipe section 50 in which there are drilled three openings in a triangular arrangement into which are interposed three transducer assemblies 51, 52 and 53, of the form shown and described in FIGS. 1 and 2 of the drawings, and operated as shown in FIG. 9. These are interposed in a direction normal to the pipe wall so that the radiating surface 2b of each of the transducer assemblies is substantially flush with the inner surface of pipe 50. Transducer assembly 51, which is located at the apex of the triangle, is connected to the output of the pulse transmitting circuit 49. The two transducer assemblies 52 and 53, which are located at the base angles of the triangle, are respectively connected to the input terminals of receivers 54 and 55, the latter being respectively tuned to two different high frequency channels designated as No. 1 and No. 2. The outputs of these two receiver channels are modulated with gating pulses derived from the gate control circuit 56 which, in turn, is synchronized with the operation of the transmitter circuit 49. The two output channels from receivers 54 and 55 are imposed on the divider circuit 57 to provide a difference signal which actuates the flowmeter indicator 58. Details of the operation of this circuit may be better understood from a study of U.S. Pat. No. 3,204,456, issued Sept. 7, 1965, to W. Welkowitz, entitled Ultrasonic Flowmeter.

It will be seen that the side beam transducer assembly 51 which simultaneously directs two beams with an angle of $\theta$ between them from the radiating surface thereof to the receiving surfaces of transducer assemblies 52 and 53, provides a novel and advantageous system of operation.

Although the patterns disclosed in FIGS. 8 through 12 have been described in general terms, it will be understood that these specific patterns, as shown, are based on measurements made with air as the fluid medium.

It will be understood that the invention is not limited to the specific forms of transducer assemblies shown and described herein by way of example; or to the specific flowmeter circuit arrangements herein shown and described, but is limited only by the scope of the claims hereinafter set forth.

What is claimed is:

1. An ultrasonic fluid flowmeter system comprising in combination at least two substantially identical separate transducer assemblies interposed into the pipe section bearing the measured fluid in spaced apart relation and oriented to respectively transmit and receive ultrasonic signals directed to and from one another along a path which obliquely intersects the path of fluid flow in said pipe, circuit means including a source of electrical power in energy transfer relation with each of said transducer assemblies, and including means for generating and imposing on said transducer assemblies high frequency alternating current electrical signals and for responding to the ultrasonic signals received by said transducer assemblies to form high frequency alternating current electrical signals and for comparing the signals received in each of said transducer assemblies, said circuit means including a meter calibrated to measure fluid flow in said pipe section as a function of the difference between the signals received by said transducer assemblies, said transducer assemblies each comprising in combination:

an ultrasonic piezoelectric generator having substantially parallel major surfaces comprising electrode means, said generator designed to vibrate in the direction of the longitudinal axis of said assembly in a resonant-thickness mode of vibration, a backing element comprising a pair of opposite major surfaces bonded in acoustic energy transfer relation with one of the parallel major surfaces of said generator, an acoustic energy transforming member bonded in acoustic energy transfer relation to the opposite parallel major surface of said generator, the cross-sectional dimension of said transforming member declining symmetrically about its longitudinal axis from a maximum in contact with the surface of said generator to a minimum in a parallel plane remote from the surface of said generator, said transforming member terminating beyond said plane of minimum cross section in integral relation with a centrally driven radiator plate of extended cross-sectional dimension normal to the longitudinal axis of said transforming member.

2. The combination in accordance with claim 1 wherein each of said transducer assemblies is interposed into said pipe section with its principal axis disposed in a direction substantially normal to the direction of fluid flow in said pipe.

3. The combination in accordance with claim 2 wherein said generating and receiving means are constructed and arranged to generate and receive high frequency alternating current electrical signals having a frequency of at least about 90 kilocycles per second.

4. The combination in accordance with claim 1 wherein said fluid is gas.

5. An ultrasonic fluid flowmeter system comprising in combination at least two substantially identical separate transducer assemblies interposed into the pipe section bearing the test fluid in spaced apart relation with their principal axes in a direction substantially normal to the direction of fluid flow in said pipe and oriented to respectively transmit and receive ultrasonic signals directed to and from one another along a path which obliquely intersects the path of fluid flow in said pipe, circuit means including a source of electrical power in energy transfer relation with each of said transducer assemblies and means for generating and imposing on said transducer assemblies high frequency alternating current electrical signals and for responding to the ultrasonic signals received by said transducer assemblies to form high frequency alternating current electrical signals and for comparing the signals received in each of said transducer assemblies, said circuit means including a meter calibrated to measure fluid flow in said pipe section as a function of the difference between the signals received by said transducer assemblies, means including said transducer assemblies each constructed and arranged to generate from each of their radiating faces a radiation pattern comprising a pair of major lobes each oppositely directed at an acute angle to a normal plane relative to the radiating face of said transducer assembly, the principal direction of at least one said lobe conforming to the transmitting and/or receiving path of said signals.

6. The combination in accordance with claim 5 wherein said fluid is gas.

* * * * *